United States Patent

Chappell et al.

(10) Patent No.: US 9,496,708 B2
(45) Date of Patent: Nov. 15, 2016

(54) ELECTRIC MOTOR DRIVE ISOLATION CIRCUIT

(71) Applicant: Allegro MicroSystems, LLC, Worcester, MA (US)

(72) Inventors: Edward Chappell, Falkirk (GB); Robert D. Christie, Fife (GB); James McIntosh, East Lothian (GB); Peter Morris, Lanark (GB)

(73) Assignee: Allegro MicroSystems, LLC, Worcester, MA (US)

(*) Notice: Subject to any disclaimer, the term of this patent is extended or adjusted under 35 U.S.C. 154(b) by 0 days.

(21) Appl. No.: 14/678,388

(22) Filed: Apr. 3, 2015

(65) Prior Publication Data

US 2015/0288304 A1 Oct. 8, 2015

Related U.S. Application Data

(60) Provisional application No. 61/976,196, filed on Apr. 7, 2014.

(51) Int. Cl.
*H02H 7/08* (2006.01)
*H02H 7/122* (2006.01)

(52) U.S. Cl.
CPC ............ *H02H 7/08* (2013.01); *H02P 29/0241* (2016.02); *H02H 7/0844* (2013.01); *H02H 7/1227* (2013.01)

(58) Field of Classification Search
CPC ... H02P 29/021; H02P 29/0241; H02H 7/00; H02H 7/08; H02H 7/1227; H02H 7/0844
See application file for complete search history.

(56) References Cited

U.S. PATENT DOCUMENTS

| | | | |
|---|---|---|---|
| 4,639,798 A * | 1/1987 | Harrison | G11B 5/5521 360/73.03 |
| 6,897,706 B2 | 5/2005 | Coutu | |
| 7,219,022 B2 | 5/2007 | Wekhande | |
| 7,590,334 B2 | 9/2009 | Yabusaki et al. | |
| 7,747,146 B2 | 6/2010 | Milano et al. | |
| 8,994,301 B2 * | 3/2015 | Son | B60L 11/007 318/139 |
| 2003/0156439 A1 * | 8/2003 | Ohmichi | H02M 7/538 363/98 |
| 2004/0160266 A1 * | 8/2004 | Coutu | H03K 17/6872 327/427 |
| 2004/0228050 A1 * | 11/2004 | Recker | B62D 5/0484 361/23 |
| 2010/0327667 A1 * | 12/2010 | Fujita | G05B 9/02 307/326 |
| 2011/0285335 A1 * | 11/2011 | Tada | H02H 7/0844 318/400.22 |
| 2013/0009578 A1 | 1/2013 | Reynolds et al. | |
| 2013/0063067 A1 * | 3/2013 | Tanaka | H01L 25/07 318/494 |
| 2013/0113405 A1 | 5/2013 | Baranyai | |

OTHER PUBLICATIONS

Allegro Datasheet A3942; Quad High-Side Gate Driver for Automotive Applications; Jan. 2008; 20 pages.
Texas Instruments Datasheet UC2625-EP; Brushless DC Motor Controller; March 2008; 25 pages.
U.S. Appl. No. 14/940,558, filed Nov. 13, 2015, Looby et al.
"Automotive 3-Phase Isolator MOSFET Driver;" Allegro Microsystems, LLC, A6861, Feb. 2014; 11 pages.

* cited by examiner

*Primary Examiner* — Shawki S Ismail
*Assistant Examiner* — Muhammad S Islam
(74) *Attorney, Agent, or Firm* — Daly, Crowley, Mofford & Durkee, LLP

(57) ABSTRACT

An isolation circuit is coupled between motor driver half bridge circuits and an electric motor. A motor controller circuit supplies motor drive signals to the motor driver half bridge circuits. The isolation circuit includes transistors coupled in series with the motor windings. Low to medium power diodes are coupled between a reference voltage source and control terminals of the transistors.

16 Claims, 2 Drawing Sheets

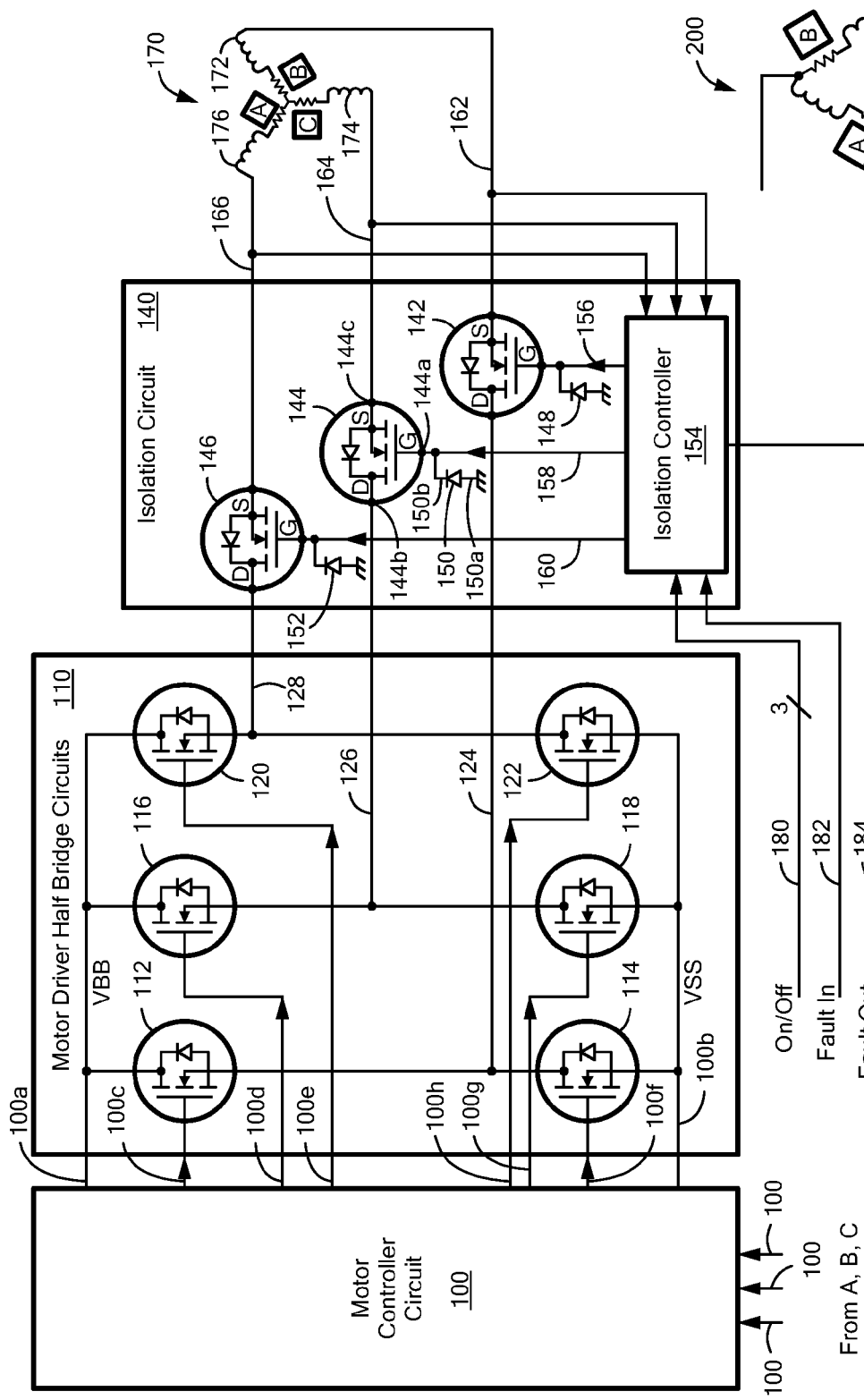

ELECTRIC MOTOR DRIVE ISOLATION CIRCUIT

CROSS REFERENCE TO RELATED APPLICATIONS

This application claims the benefit under 35 U.S.C. §119 (e) of U.S. Provisional Application No. 61/976,196, filed Apr. 7, 2014, which application is incorporated herein by reference in its entirety.

STATEMENT REGARDING FEDERALLY SPONSORED RESEARCH

Not Applicable.

FIELD OF THE INVENTION

This invention relates generally to electric motor drive circuits and, more particularly, to a circuit that can isolate motor drive signals from an electric motor without being damaged by inductive voltage transients.

BACKGROUND

Circuits to control and drive brushless DC (BLDC) electric motors are known. Conventionally, the circuits provide a plurality motor drive signals, each at a different phase, and each coupled to one of a respective plurality of motor windings. The motor drive signals can have one of a plurality of different signal characteristics. In a trapezoidal drive arrangement, the motor drive signals are pulse width modulated (PWM) signals, wherein average values of the PWM signals follow respective trapezoidal patterns. In a sine drive arrangement, the motor drive signals are pulse width modulated (PWM) signals, wherein average values of the PWM signals follow respective sinusoidal patterns.

Some known electric motor drive circuits are described in U.S. Pat. No. 7,590,334, issued Sep. 15, 2009, U.S. Pat. No. 7,747,146, issued Jun. 29, 2010, and U.S. patent application Ser. No. 13/271,723, filed Oct. 12, 2011 and entitled "Electronic Circuit And Method Generating Electric Motor Drive Signals Having Phase Advances In Accordance With A User Selected Relationship Between Rotational Speed Of An Electric Motor And The Phase Advances," each of which is assigned to the assignee of the present invention.

The motor controller can have first and second parts, which can be disposed together on a common circuit board, or which can be disposed on separate circuit boards. A motor control circuit, which generates low power drive signals, forms the first part. A plurality of half bridge circuits, which receive the low power drive signals and generate higher power drive signal to motor windings, forms the second part, and is coupled to an electric motor.

Certain fault conditions in one or more of the half bridge circuits or in the electric motor can result in a braking torque upon the electric motor. Braking torque may be undesirable in many applications, for example, in an automobile electrically assisted power steering system. The braking torque would make the automobile, which would already be difficult to manually steer due to the fault and loss of electrical assist, even more difficult to manually steer due to the braking torque.

To avoid the above condition, in some applications, it is desirable to provide an isolation circuit coupled between the half bridge circuits and the motor windings. However, when current to motor windings is turned off, inductive voltage transients on the motor windings can cause the isolation circuit to fail. To reduce the likelihood of this failure mode, high power diodes have been coupled to the electric motor to directly limit excursions of the inductive voltage transients that occur when motor windings are turned off. High power diodes are large and expensive.

Thus, it would be desirable to provide low power circuit elements that can protect an isolation circuit that is coupled between half bridge circuits and motor windings.

SUMMARY

The present invention provides low power circuit elements that can protect an isolation circuit that is coupled between half bridge circuits and motor windings.

In accordance with an example useful for understanding an aspect of the invention, a motor driver circuit includes an isolation circuit. The isolation circuit includes a plurality of transistors. Each one of the plurality of transistors having a respective first current passing terminal, a respective second current passing terminal, and a respective control terminal. Each respective first current passing is configured to couple to a respective one of a plurality of half bridge circuits, and each respective second current passing terminal is configured to couple to a respective winding of an electric motor. The isolation circuit also includes a plurality of diodes. Each one of the plurality of diodes has a respective anode end and a respective cathode end. Each respective cathode end or each respective anode end is coupled to a respective control terminal of a respective one of the plurality of transistors. The other one of each respective anode end or each respective cathode end is coupled to a reference voltage source.

BRIEF DESCRIPTION OF THE DRAWINGS

The foregoing features of the invention, as well as the invention itself may be more fully understood from the following detailed description of the drawings, in which:

FIG. 1 is a block diagram showing an example of an isolation circuit coupled between motor driver half bridge circuits and an electric motor having windings arranged in a star configuration, and showing a motor controller circuit coupled to drive the motor driver half bridge circuits;

FIG. 2 is a block diagram showing an alternate electric motor with windings arranged a a D configuration that can be used in place of the motor of FIG. 1.

DETAILED DESCRIPTION

Figure 3:
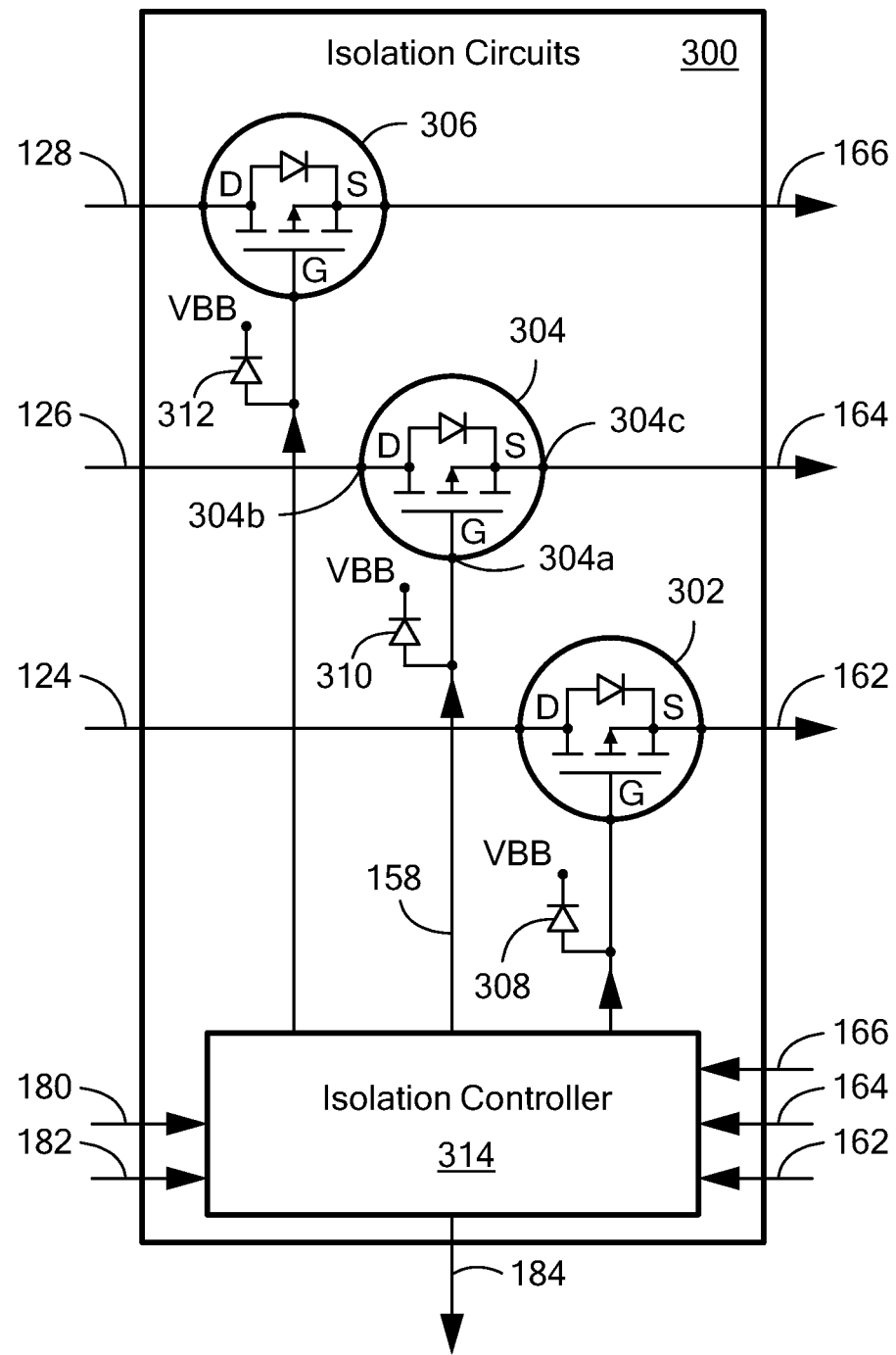
FIG. 3 is a block diagram of an alternative isolation circuit that can be used in place of the isolation circuit of FIG. 1.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

As used herein, the term "current passing terminal" is used to describe a terminal of an electronic component into which current can flow or out of which current can flow. The electronic component can be an active electronic component or a passive electronic component.

As used herein, the term "active electronic component" is used to describe an electronic component that has at least one p-n junction. A transistor, a diode, and a logic gate are examples of active electronic components. In contrast, as used herein, the term "passive electronic component" as used to describe an electronic component that does not have at least one p-n junction. A capacitor, a resistor, and a relay are examples of passive electronic components.

Referring to FIG. 1, an example isolation circuit 140 includes a plurality of transistors, here, first, second and third transistors 142, 144, 146, respectively, configured to couple to first, second, and third windings 172, 174, 176, respectively, of an electric motor 170. Taking the second transistor 144 as representative of the first and third transistors 142, 146, the second transistor 144 has a first current passing terminal 144b, a second current passing terminal 144c, and a control terminal 144a. The second current passing terminal 144c is configured to couple to the second winding 174 of the electric motor 170. The first current passing terminal 144b is configured to couple to motor driver half bridge circuits 110, and, in particular, to a motor driver half bridge circuit 116, 118.

While the motor drive half bridge circuits are shown have n-type MOSFET transistors, in other arrangements, p-type MOSFETs or other types of transistors can also be used.

A motor controller circuit (e.g., module) can generate signals 100c, 100d, 100e, 100f, 100g, 100h as respective PWM signals to control terminals of transistors within the motor driver half bridge circuits. Trapezoidal and sinusoidal types of signals are described above and can be PWM signals for which an average value is either trapezoidal or sinusoidal.

Some known motor controller circuits are described in U.S. Pat. No. 7,590,334, issued Sep. 15, 2009, U.S. Pat. No. 7,747,146, issued Jun. 29, 2010, and U.S. patent application Ser. No. 13/271,723, filed Oct. 12, 2011 and entitled "Electronic Circuit And Method Generating Electric Motor Drive Signals Having Phase Advances In Accordance With A User Selected Relationship Between Rotational Speed Of An Electric Motor And The Phase Advances," each of which is incorporated by reference here and each of which is assigned to the assignee of the present invention.

The motor controller circuit 100 can also provide positive and negative supply voltages VBB, VSS to the motor driver half bridge circuits 110.

The first, second, and third transistors 142, 144, 146 are shown here to be n-type metal oxide semiconductor field effect transistors (MOSFETs), wherein the first current passing terminals (e.g., 144b) are drain terminals, the second current passing terminals (e.g., 144c) our source terminals, and the control terminals (e.g., 144a) are gate terminals.

The isolation circuit 140 also includes a plurality of diodes, here, first, second, and third diodes 148, 150, 152, respectively, coupled to the first second and third transistors 142, 144, 146, each coupled in the same way. Taking the second diode 150 as representative of the first and third diodes 148, 152, the second diode 150 has an anode end 150a and a cathode end 150b. The cathode end 150b is coupled to the control terminal 144a of the second transistor 144 and the anode end 150b is coupled to a reference voltage source, here to system ground. While shown to be coupled to system ground, in other embodiments, the anode ends (e.g., 150b) of the diodes 156, 158, 160 can instead be coupled to a different reference voltage source, for example, one volt above ground.

The isolation circuit 140 further includes an isolation controller (or module) 156 for generating a plurality of control signals, here, first, second, and third control signals 156, 158, 160, respectively. Each control signal 156, 158, 160 is coupled to a respective control terminal of a respective one of the first, second, and third transistors 142, 144, 146.

In some embodiments, the isolation controller 154 can be for example, a part number A-6861 by Allegro Microsystems LLC of Worcester, Mass., USA.

The isolation controller 154 can be coupled to receive one or more (here three) an on/off signals 180. The on/off signals 180 can have at least two states. A first state one of the on/off signals 180 results in a respective one of the plurality of control signals 156, 158, 160 turning on a respective one of the plurality of transistors 142, 144, 146, and a second state results in the respective one of the plurality of control signals 156, 158, 160 turning off the respective one of the plurality of transistors 142, 144, 146. When on, the transistors 142, 144, 146 pass the signals 124, 126, 128 to the electric motor 170, and when off, the signals 124, 126, 128 are not communicated to the electric motor.

In other embodiments, there can be one on/off control signal that causes all three transistors 142, 144, 146 to turn on or off in response to the one on/off signal In some embodiments, the isolation controller 154 can be coupled to receive a fault signal 182 having at least two states. A first state of the fault signal 182 results in the plurality of control signals 156, 158, 160 turning on the plurality of transistors 142, 144, 146, and a second state results in the plurality of control signals 156, 158, 160 turning off the plurality of transistors 142, 144, 146. The second state of the fault signal 182 is indicative of at a fault.

The above fault includes at least one of a fault of the electric motor 170, a fault of a mechanical assembly (e.g., an automobile power steering component, not shown) coupled to the electric motor 170, a fault of the motor driver half bridge circuits 110, or a fault of the motor controller circuit 100.

In some embodiments, the isolation controller 154 can be configured to generate a fault signal 184 having at least two states. A first state of the fault signal 184 results in the plurality of control signals 156, 158, 160 turning on the plurality of transistors 142, 144, 146, and a second state results in the plurality of control signals 156, 158, 160 turning off the plurality of transistors 142, 144, 146. The second state of the fault signal 184 is indicative of a fault, wherein the fault includes of at least one of the electric motor 170 or the isolation circuit 140.

The isolation controller 154 can be coupled to receive signals 162, 164, 166 appearing at respective motor windings 172, 174, 176.

In operation, when the on-off signals 180 and the fault signal 182 are in states for which the control signals 156, 158, 160 turn on the first, second, and third transistors 142, 144, 146, then signals generated by the motor driver half bridge circuits 110 are communicated to the motor windings 172, 174, 172.

In order to turn on the first, second, and third transistors 142, 144, 146, respective control signals 156, 158, 160 must float on and above the signals 162 164, 166. For example, to turn on the second transistor 144, here shown to be an n-type MOSFET, the control signal 158 must maintain at least a particular gate-source on voltage, for example, a gate voltage five volts above the source voltage 164. Thus, as the motor driver half bridge circuits 110 drive high and low signals to the motor windings 172, 174, 176, the control signals 156, 158, 160 must maintain the gate source on voltage, for example, five volts above the signals 162, 164, 166.

When any one or more of the plurality of transistors 142, 144, 146 are switched to an off condition (i.e., the control signals 156, 158, 160 take on a low state, e.g., maintaining a floating zero gate-source voltage) a respective motor winding 172, 174, 176 coupled to the plurality of transistors 142, 144, 146 can experience a substantial negative voltage transient due to inductance of the motor windings 172, 174, 176. The negative voltage transient can be tens or hundreds of volts. Without protection, the negative voltage transients can cause one or more of the plurality of transistors 142, 144, 146 to exceed breakdown voltage limits, and therefore fail.

It will be appreciated that the motor windings can attempt to generate both positive and negative voltage transients. However, here, positive voltage transients are clamped below the upper power supply voltage, VBB, by current flowing through intrinsic diodes within the first, second, and third transistors 142, 144, 146 along with intrinsic diodes within the transistors 112, 116, 120. In contrast, negative voltage transient on the motor windings cannot dissipate through the intrinsic diode the first, second, and third transistors 142, 144, 146, which point in the wrong direction. Thus, for the isolation circuit 140, it is the negative voltage transients that present a failure mode that can cause the transistors 142, 144, 146 to fail due to voltage breakdown.

The isolation circuit 140 provides a means by which the motor 170 and the motor driver half bridge circuits 110 can be isolated from each other.

The plurality of diodes 148, 150, 152 stop the above-described failure mode that would otherwise result from negative voltage transients on the motor windings 172, 174, 176.

Taking operation of the second diode 150 is representative of operation of the first and third diodes 148, 152, respectively, when the motor winding 174 experiences a negative voltage transient on an end of the motor winding 174 to which the second transistor 144 is coupled, the diode 150 causes the control signal 158 to be clamped at or near zero volts. Clamping the control signal 158 at or near zero volts results in a positive gate-source voltage when the negative voltage transient on the motor winding 174 occurs. The positive gate-source voltage causes the second transistor 144 to temporarily stay on during the negative voltage transient even when the control signal 158 attempts to float to a low level that would otherwise turn off the second transistor 144. Since the second transistor 144 is on during the negative voltage transient on the motor winding 174, the negative voltage transient on the motor winding 174 causes current to flow from the first current passing terminal 144b to the second current passing terminal 144c to the motor winding 174. The current causes the negative voltage transient to quickly dissipate.

In a first case, if the motor driver half bridge circuit 116, 118, to which the second transistor 144 is coupled, is on during the negative voltage transient on the motor winding 174, then the motor driver half bridge circuit 116, 118 supplies the current to dissipate the negative voltage transient on the motor winding 174 from the positive supply, VBB. In a second case, if the motor driver half bridge circuit 116, 118 is not on during the negative voltage transient on the motor winding 174, then an intrinsic diode within the lower transistor 118 of the motor driver half bridge circuit 116, 118 supplies the current to dissipate the negative voltage transient on the motor winding 174 from the negative supply, VSS.

In both of the above-described cases, it should be appreciated that the components that pass current to dissipate the negative voltage transient on the motor winding 174, namely, the second transistor 144 and the motor driver half bridge circuit 116, 118, are power components capable of driving large currents when they are on. However, it should also be appreciated that the diode 150 can be a relatively low power diode, having only enough power to overcome the control signal 158 as it attempts to go below ground floating with the signal 164.

In order to overcome the control signals 156, 158, 160, in some embodiments, circuit drivers within the isolation controller that generate the control signals 156, 158, 160 can have a moderately high output impedance, for example, ten ohms, one hundred ohms, one thousand ohms, or ten thousand ohms. Any values within those ranges can be used.

The fault signal 184 can indicate, for example, an abnormal voltage condition of any one or more of the signals 162, 164, 166. The fault signal 184 can also indicate, for example an abnormal current draw on any one of the control signals 156, 158, 160.

While three transistors 142, 144, 146 are shown to couple to three motor windings 172, 174, 176 it should be appreciated that there can be more than or fewer than three motor windings and a corresponding more than or fewer than three transistors.

While the three transistors 142, 144, 146 are shown to be n-type MOSFETs, in other embodiments, the three transistors can be p-type MOSFETs, of insulated gate bipolar transistors (IGBTs). In some embodiments, the MOSFETS are enhancement type MOSFETs. In some embodiments, the MOSFETS are double-diffused metal-oxide-semiconductor (DMOS) field effect transistors.

An example isolation circuit having p-type MOSFETs is shown below in FIG. 3.

For IGBTs, the above-described first current passing terminals (e.g., 144b) corresponds to collectors of the IGBTs, the second current passing terminals (e.g., 144c) correspond to emitters of the IGBTs, and the control terminals (e.g., 144a) correspond to gates of the IGBTs.

For IGBTs, the above-described gate-source on voltage of, for example, five volts, is replaced by a gate-emitter on voltage of also about five volts.

In other embodiments, the three transistors can be bipolar junction transistors (BJTs), where the above-described first current passing terminals (e.g., 144b) corresponds to collectors of the BJTs, the second current passing terminals (e.g., 144c) correspond to emitters of the BJTs, and the control terminals (e.g., 144a) correspond to bases of the BJTs.

For BJTs, the above-described gate-source on voltage of, for example, five volts, is replaced by a base-emitter on voltage of, for example, 0.8 Volts.

Still other types of transistors can be used in the isolation circuit 140.

In some embodiments, the diodes 148, 150, 152 are small signal diodes capable of about 0.25 Watts. In some other embodiments, the diodes 148, 150, 152 are low power diodes capable of about 1.0 Watts.

In some embodiments, the diodes 148, 150, 152 are discrete devices arranged upon a circuit board along with the transistors 142, 144, 146 and with the isolation controller 154. However, in some embodiments, the diodes 148, 150, 152 can be within the isolation controller.

In some embodiments, the isolation circuit 140 and the motor driver half bridge circuits 110 are disposed on a common circuit board. In some embodiments, the isolation circuit, 140, the motor driver half bridge circuits, and the motor controller circuit 100 are arranged on a common circuit board. In some arrangements, the motor controller circuit 100 and the motor driver half bridge circuits 110 are arranged on a common circuit board and the isolation circuits is arranged on a separate circuit board.

In some embodiments, the plurality of diodes 148, 150, 152 is integrated within the isolation controller 154, e.g., on a common integrated circuit substrate.

Applications of the isolation circuit 140 include, for example, automobile systems, including, but not limited to, electric motor power steering assist systems and electric turbocharger systems. As described above, it is particularly important to avoid not only a fault in an electric motor drive system, but also a braking torque that may remain from the fault. Automobile systems are presently required to conform to automotive safety integrity levels (ASIL) design standards. The isolation circuit 140 may have characteristics that allow it to comply with automobile safety standards.

Referring to FIG. 2, an example electric motor 200 has three windings coupled in a D configuration. The electric motor 200 can be used in place of the electric motor 170 of FIG. 1.

Referring now to FIG. 3, in which like elements of FIG. 1 are shown having like reference designators, three p-type MOSFET transistors 302, 340, 306 are used in place of the n-type MOSFETs of FIG. 1. Drains, sources, and gates of the p-type MOSFET transistors couple in the same way as the n-type MOSFET transistors of FIG. 1.

An isolation controller 314 is similar to the isolation controller 154 of FIG. 1, except here, the control signals must float with the signals 162, 164, 166 to maintain a negative gate source on voltage, for example, negative five volts, when the transistors are turned on. In other words, the control signals provide a gate voltage below the source voltage to turns the p-type MOSFETs on.

The isolation circuit 140 can be used to protect against positive voltage transients (above VBB) that may appear on the motor windings. Diodes 308, 310, 312 are coupled to respective ones of the p-type MOSFET transistors 302, 304, 306. Unlike the diodes 148, 150, 152 of FIG. 1, the diodes are coupled such that anode ends are coupled to respective gates of the p-type MOSFET transistors, and cathode ends are coupled to a positive voltage source, for example, VBB.

As described above, it will be appreciated that the motor windings can attempt to generate positive and negative voltage transients. However, here, negative voltage transients are clamped above the lower power supply voltage, VSS, by current flowing through intrinsic diodes within the first, second, and third transistors 142, 144, 146 along with intrinsic diodes within the transistors 114, 118, 122 of FIG. 1. In contrast, positive voltage transient on the motor windings cannot dissipate through the intrinsic diodes of the first, second, and third transistors 302, 304, 306, which point in the wrong direction. Thus, for the isolation circuit 300, it is the positive voltage transients that present a failure mode that can cause the transistors 302, 304, 306 to fail due to voltage breakdown.

Operation is similar to operation described above in conjunction with FIG. 1. Here, however, one of more of the transistors 302, 304, 306 temporarily remains on during a positive voltage transient on a respective one of the motor windings 172, 174, 176 of FIG. 1 due to operation of the diodes 308, 310, 312, which clamp the gate voltages near VBB as the positive voltage transients occur, resulting in a negative gate source voltage to turn the transistors on until the positive voltage transients dissipate.

Operation of the isolation circuits 140, 300 allows the electric motor s 170, 200 to achieve a torque-free "coast" mode when it is desired to turn off the drive signals to the electric motor.

While an isolation circuits are described above that can isolate drive signals to an electric motor, it should be appreciated that the same or similar isolation circuits can be used when driving any type of inductive load, and not only an electric motor.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A motor driver circuit, comprising:
   an isolation circuit, comprising:
   a plurality of transistors, each one of the plurality of transistors having a respective first current passing terminal, a respective second current passing terminal, and a respective control terminal, wherein each control terminal comprises a respective base terminal or a respective gate terminal, wherein each respective first current passing terminal is configured to couple to a respective one of a plurality of half bridge circuits, wherein each respective second current passing terminal is configured to couple to a respective winding of an electric motor, and wherein each respective control terminal is coupled to a respective one of a plurality of control signals, each control signal floating relative to a voltage of a respective winding of the electric motor; and
   a plurality of diodes, each one of the plurality of diodes having a respective anode end and a respective cathode end, wherein each respective cathode end or each respective anode end is coupled to a respective control terminal of a respective one of the plurality of transistors, and wherein the other one of each respective anode end or each respective cathode end is coupled to a reference voltage source, the same reference voltage source coupled to each one of the plurality of diodes, wherein the reference voltage source provides a continuous, uninterrupted, and fixed reference voltage coupled to each respective anode end or each respective cathode end.

2. The motor driver circuit of claim 1, wherein the reference voltage source is a system ground.

3. The motor driver circuit of claim 1, wherein the reference voltage source is a positive power supply.

4. The motor driver circuit of claim 1, wherein each one of the plurality of diodes is a respective small signal diode having a maximum rating of less than one Watt.

5. The motor driver circuit of claim 1, wherein each one of the plurality of transistors comprises a field effect transistor, wherein the first current passing terminals correspond to drain terminals, the second current passing terminals correspond to source terminals, and the control terminals correspond to gate terminals.

6. The motor driver circuit of claim 1, wherein each one of the plurality of transistors comprises an insulated gate bipolar transistor, wherein the first current passing terminals correspond to emitter terminals, the second current passing terminals correspond to collector terminals, and the control terminals correspond to gate terminals.

7. The motor driver circuit of claim 1, wherein each one of the plurality of half bridge circuits comprises a respective pair of n-channel FETs.

8. The motor driver circuit of claim 1, wherein the isolation circuit further comprises:
   an isolation controller for generating the plurality of control signals.

9. The motor driver circuit of claim 8, wherein the plurality of diodes is integrated within the isolation controller.

10. The motor driver circuit of claim 8, wherein the isolation controller is coupled to receive an on/off signal having at least two states, wherein a first state results in at least one of the plurality of control signals turning a respective at least one of the plurality of transistors on, and wherein a second state results in the at least one of the plurality of control signals turning the respective at least one of the plurality of transistors off.

11. The motor driver circuit of claim 8, wherein the isolation controller is coupled to receive a fault signal having at least two states, wherein a first state results in the plurality of control signals turning the plurality of transistors on, and wherein the second state results in the plurality of control signals turning the plurality of transistors off, wherein the second state of the fault signal is indicative of at a fault.

12. The motor driver circuit of claim 11, wherein the fault comprises at least one of a fault of the electric motor, a fault of a mechanical assembly coupled to the electric motor, a fault of at least one of the plurality of half bridge circuits, or a fault of a motor controller circuit.

13. The motor driver circuit of claim 8, wherein the isolation controller is configured to generate a fault signal having at least two states, wherein a first state results in the plurality of control signals turning the plurality of transistors on, and wherein the second state results in the plurality of control signals turning the plurality of transistors off, wherein the second state of the fault signal is indicative of a fault of at least one of the electric motor or the isolation circuit.

14. The motor driver circuit of claim 7, further comprising:
   the plurality of half bridge circuits.

15. The motor driver circuit of claim 14, wherein each one of the plurality of half bridge circuits comprises a respective pair of n-channel FETs.

16. The motor driver circuit of claim 14, further comprising:
   a motor controller circuit coupled to drive the plurality of half bridge circuits and coupled to receive at least one signal indicative of a rotational position of the electric motor.

* * * * *

UNITED STATES PATENT AND TRADEMARK OFFICE
CERTIFICATE OF CORRECTION

PATENT NO. : 9,496,708 B2
APPLICATION NO. : 14/678388
DATED : November 15, 2016
INVENTOR(S) : Edward Chappell et al.

Page 1 of 1

It is certified that error appears in the above-identified patent and that said Letters Patent is hereby corrected as shown below:

In the Specification

Column 1, Line 53 delete "drive signal" and replace with --drive signals--.

Column 2, Line 46 delete "arranged a a D" and replace with --arranged in a D--.

Column 3, Line 36 delete "shown have" and replace with --shown having--.

Column 3, Line 63 delete "our source" and replace with --are source--.

Column 4, Line 37 delete "signal" and replace with --signal.--.

Column 5, Line 3 delete "172, 174, 172." and replace with --172, 174, 176.--.

Column 7, Line 43 delete "302, 340, 306" and replace with --302, 304, 306--.

Column 7, Line 53 delete "to turns the" and replace with --to turn the--.

Column 8, Line 19 delete "electric motor s" and replace with --electric motors--.

Signed and Sealed this
Thirteenth Day of February, 2018

Andrei Iancu
*Director of the United States Patent and Trademark Office*